United States Patent
Stout

(10) Patent No.: US 12,294,581 B2
(45) Date of Patent: May 6, 2025

(54) IDENTIFYING SECURITY VULNERABILITIES BASED ON ACCESS CONTROL LISTS

(71) Applicant: ServiceNow, Inc., Santa Clara, CA (US)

(72) Inventor: Adam David Stout, Santa Clara, CA (US)

(73) Assignee: ServiceNow, Inc., Santa Clara, CA (US)

( * ) Notice: Subject to any disclaimer, the term of this patent is extended or adjusted under 35 U.S.C. 154(b) by 204 days.

(21) Appl. No.: 18/209,891

(22) Filed: Jun. 14, 2023

(65) Prior Publication Data
US 2024/0422158 A1  Dec. 19, 2024

(51) Int. Cl.
*H04L 9/40* (2022.01)
*H04L 41/22* (2022.01)

(52) U.S. Cl.
CPC ............ *H04L 63/101* (2013.01); *H04L 41/22* (2013.01); *H04L 63/105* (2013.01)

(58) Field of Classification Search
CPC ...... H04L 63/101; H04L 41/22; H04L 63/105
See application file for complete search history.

(56) References Cited

U.S. PATENT DOCUMENTS

| | | |
|---|---|---|
| 4,941,084 A | 7/1990 | Terada |
| 5,185,860 A | 2/1993 | Wu |
| 5,237,518 A | 8/1993 | Sztipanovits |
| 5,261,097 A | 11/1993 | Saxon |
| 5,265,252 A | 11/1993 | Rawson, III |
| 5,367,685 A | 11/1994 | Gosling |
| 5,390,297 A | 2/1995 | Barber |
| 5,442,791 A | 8/1995 | Wrabetz |
| 5,452,415 A | 9/1995 | Hotka |
| 5,522,042 A | 5/1996 | Fee |
| 5,533,116 A | 7/1996 | Vesterinen |
| 5,655,081 A | 8/1997 | Bonnell |
| 5,659,736 A | 8/1997 | Hasegawa |
| 5,671,412 A | 9/1997 | Christiano |

(Continued)

FOREIGN PATENT DOCUMENTS

| | | |
|---|---|---|
| EP | 0433979 A2 | 6/1991 |
| EP | 1607824 A2 | 12/2005 |

(Continued)

OTHER PUBLICATIONS

AppOmni, ServiceNow ACL Misconfiguration Assessment, downloaded from https://appomni.com, Apr. 6, 2023.
ServiceNow, Utah Platform Security, May 29, 2023.

*Primary Examiner* — El Hadji M Sall
(74) *Attorney, Agent, or Firm* — McDonnell Boehnen Hulbert & Berghoff LLP

(57) ABSTRACT

An example embodiment may involve: obtaining a representation of an access control list (ACL), wherein the ACL includes an entry that defines user capabilities with respect to a computing resource; determining a user class based on the entry and one or more rules, wherein the one or more rules are based on whether the computing resource is a database table for a task-based application, and wherein the one or more rules are based on whether the computing resource is read accessible or write accessible; and providing, for display on a graphical user interface, an indication of the user class.

20 Claims, 11 Drawing Sheets

(56) References Cited

U.S. PATENT DOCUMENTS

| | | |
|---|---|---|
| 5,696,701 A | 12/1997 | Burgess |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke |
| 5,887,139 A | 3/1999 | Madison, Jr. |
| 5,909,217 A | 6/1999 | Bereiter |
| 5,937,165 A | 8/1999 | Schwaller |
| 5,949,976 A | 9/1999 | Chappelle |
| 5,978,594 A | 11/1999 | Bonnell |
| 6,021,437 A | 2/2000 | Chen |
| 6,041,347 A | 3/2000 | Harsham |
| 6,088,717 A | 7/2000 | Reed |
| 6,101,500 A | 8/2000 | Lau |
| 6,128,016 A | 10/2000 | Coelho |
| 6,131,118 A | 10/2000 | Stupek, Jr. |
| 6,134,581 A | 10/2000 | Ismael |
| 6,138,122 A | 10/2000 | Smith |
| 6,148,335 A | 11/2000 | Haggard |
| 6,166,732 A | 12/2000 | Mitchell |
| 6,167,448 A | 12/2000 | Hemphill |
| 6,175,866 B1 | 1/2001 | Holloway et al. |
| 6,175,878 B1 | 1/2001 | Seaman |
| 6,260,050 B1 | 7/2001 | Yost |
| 6,263,457 B1 | 7/2001 | Anderson |
| 6,272,150 B1 | 8/2001 | Hrastar |
| 6,289,462 B1 * | 9/2001 | McNabb ............. G06F 21/6218 726/4 |
| 6,336,138 B1 | 1/2002 | Caswell |
| 6,363,421 B2 | 3/2002 | Barker |
| 6,393,386 B1 | 5/2002 | Zager |
| 6,397,245 B1 | 5/2002 | Johnson, II |
| 6,434,626 B1 | 8/2002 | Prakash |
| 6,438,592 B1 | 8/2002 | Killian |
| 6,456,306 B1 | 9/2002 | Chin |
| 6,466,932 B1 | 10/2002 | Dennis |
| 6,487,590 B1 | 11/2002 | Foley |
| 6,505,248 B1 | 1/2003 | Casper |
| 6,526,442 B1 | 2/2003 | Stupek, Jr. |
| 6,621,823 B1 | 9/2003 | Mellquist |
| 6,707,795 B1 | 3/2004 | Noorhosseini |
| 6,742,015 B1 * | 5/2004 | Bowman-Amuah ..... G06F 8/20 718/100 |
| 6,763,380 B1 | 7/2004 | Mayton |
| 6,816,898 B1 | 11/2004 | Scarpelli |
| 6,895,586 B1 | 5/2005 | Brasher |
| 6,948,175 B1 | 9/2005 | Fong |
| 6,985,901 B1 | 1/2006 | Sachse |
| 7,003,564 B2 | 2/2006 | Greuel |
| 7,028,228 B1 | 4/2006 | Lovy |
| 7,043,537 B1 | 5/2006 | Pratt |
| 7,043,661 B2 | 5/2006 | Valadarsky |
| 7,062,683 B2 | 6/2006 | Warpenburg |
| 7,096,459 B2 | 8/2006 | Keller |
| 7,146,574 B2 | 12/2006 | Goldthwaite |
| 7,197,466 B1 | 3/2007 | Peterson |
| 7,215,360 B2 | 5/2007 | Gupta |
| 7,216,304 B1 | 5/2007 | Gourdol |
| 7,222,147 B1 | 5/2007 | Black |
| 7,281,170 B2 | 10/2007 | Taylor |
| 7,412,502 B2 | 8/2008 | Fearn |
| 7,505,872 B2 | 3/2009 | Keller |
| 7,593,013 B2 | 9/2009 | Agutter |
| 7,596,716 B2 | 9/2009 | Frost |
| 7,617,073 B2 | 11/2009 | Trinon |
| 7,660,731 B2 | 2/2010 | Chaddha |
| 7,676,294 B2 | 3/2010 | Baier |
| 7,676,437 B2 | 3/2010 | Satkunanathan |
| 7,840,490 B1 | 11/2010 | Sellers |
| 7,877,783 B1 | 1/2011 | Cline |
| 7,890,869 B1 | 2/2011 | Mayer |
| 7,966,398 B2 | 6/2011 | Wiles, Jr. |
| 8,060,396 B1 | 11/2011 | Bessler |
| 8,196,210 B2 | 6/2012 | Sterin |
| 8,321,948 B2 | 11/2012 | Robinson |
| 8,407,669 B2 | 3/2013 | Yee |
| 8,554,750 B2 | 10/2013 | Rangarajan |
| 8,595,647 B2 | 11/2013 | Sabin |
| 8,620,818 B2 | 12/2013 | Hughes |
| 8,646,093 B2 | 2/2014 | Myers |
| 8,674,992 B2 | 3/2014 | Poston |
| 8,725,647 B2 | 5/2014 | Disciascio |
| 8,843,994 B2 * | 9/2014 | Tandon ................. H04L 63/101 713/153 |
| 9,053,460 B2 | 6/2015 | Gilbert |
| 10,673,963 B1 | 6/2020 | Feiguine |
| 10,749,943 B1 | 8/2020 | Feiguine |
| 10,771,344 B2 | 9/2020 | Bitterfeld |
| 10,824,650 B2 | 11/2020 | Bar Oz |
| 10,944,654 B2 | 3/2021 | Rimar |
| 10,999,152 B2 | 5/2021 | Bar Oz |
| 11,025,481 B1 | 6/2021 | Louca |
| 11,089,115 B2 | 8/2021 | Garty |
| 11,095,506 B1 | 8/2021 | Erblat |
| 11,275,580 B2 | 3/2022 | Tamir |
| 11,277,475 B1 | 3/2022 | Tal |
| 11,281,442 B1 | 3/2022 | Tal |
| 11,296,922 B2 | 4/2022 | Leibkowiz |
| 11,301,503 B2 | 4/2022 | Burli |
| 11,379,089 B2 | 7/2022 | Goswami |
| 11,418,393 B1 | 8/2022 | Soby |
| 11,451,573 B2 | 9/2022 | Waplington |
| 11,470,107 B2 | 10/2022 | Waplington |
| 11,930,013 B1 * | 3/2024 | Zhang ................. G06F 16/9024 |
| 2002/0116340 A1 | 8/2002 | Hellberg |
| 2002/0133584 A1 | 9/2002 | Greuel |
| 2002/0158969 A1 | 10/2002 | Gupta |
| 2003/0118087 A1 | 6/2003 | Goldthwaite |
| 2003/0200293 A1 | 10/2003 | Fearn |
| 2005/0015217 A1 | 1/2005 | Weidl |
| 2005/0091356 A1 | 4/2005 | Izzo |
| 2006/0026453 A1 | 2/2006 | Frost |
| 2006/0095461 A1 | 5/2006 | Raymond |
| 2006/0179058 A1 | 8/2006 | Bram |
| 2006/0293942 A1 | 12/2006 | Chaddha |
| 2007/0033279 A1 | 2/2007 | Battat |
| 2007/0188494 A1 | 8/2007 | Agutter |
| 2007/0288389 A1 | 12/2007 | Vaughan |
| 2008/0133289 A1 | 6/2008 | Armour |
| 2008/0148253 A1 | 6/2008 | Badwe |
| 2008/0319779 A1 | 12/2008 | Hughes |
| 2009/0088875 A1 | 4/2009 | Baier |
| 2009/0228984 A1 | 9/2009 | Sterin |
| 2010/0110932 A1 | 5/2010 | Doran |
| 2012/0096521 A1 * | 4/2012 | Peddada ................. H04L 41/28 726/4 |
| 2018/0123940 A1 | 5/2018 | Rimar |
| 2019/0073257 A1 | 3/2019 | Dasgupta |
| 2019/0104398 A1 | 4/2019 | Owen |
| 2020/0050689 A1 | 2/2020 | Tal |
| 2020/0204443 A1 | 6/2020 | Bar Oz |
| 2020/0301678 A1 | 9/2020 | Burman |
| 2021/0194764 A1 | 6/2021 | Badyan |
| 2022/0029886 A1 | 1/2022 | Hameiri |
| 2022/0335383 A1 * | 10/2022 | Koleoso ................. G06Q 10/101 |

FOREIGN PATENT DOCUMENTS

| | | |
|---|---|---|
| WO | 9934285 W | 7/1999 |
| WO | 0052559 W | 9/2000 |
| WO | 0179970 W | 10/2001 |

* cited by examiner

IDENTIFYING SECURITY VULNERABILITIES BASED ON ACCESS CONTROL LISTS

BACKGROUND

Large-scale, multi-user computing platforms may have access to hundreds or thousands of files, databases, database tables, database table entries, interfaces, and/or other computing resources stored in one or more local or remote storage systems. The ability to interact with these computing resources may be controlled, per user or per user group, by access control lists (ACLs). Each entry in an ACL may specify the capabilities that a specific user or entity may have with respect to one or more corresponding computing resources. Thus, the correctness of ACLs can be critical to platform security. In practice, ACLs can become lengthy and complicated, with tens of thousands of entries on a single instance of a platform. This makes determining ACL-related security vulnerabilities on that platform technically challenging and a task that is often omitted due to its difficulty.

SUMMARY

The implementations herein address these and potentially other technical problems in the state of the art in an organized, predictable, and easy-to-understand fashion. Notably, a software application can analyze the ACLs for a computing platform and classify each user into one of a short list of user classes based on the content of the user's ACLs. These results are stored or presented as output, with likely security vulnerabilities flagged as such. With this information, administrators of the platform can rapidly address the identified security vulnerabilities. In some cases, the software application that determines the security vulnerabilities or an adjunct application can automatically modify the ACLs to remove at least some of the security vulnerabilities.

Accordingly, a first example embodiment may involve obtaining a representation of an ACL, wherein the ACL includes an entry that defines user capabilities with respect to a computing resource; determining a user class based on the entry and one or more rules, wherein the one or more rules are based on whether the computing resource is a database table for a task-based application, and wherein the one or more rules are based on whether the computing resource is read accessible or write accessible; and providing, for display on a graphical user interface, an indication of the user class.

A second example embodiment may involve a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
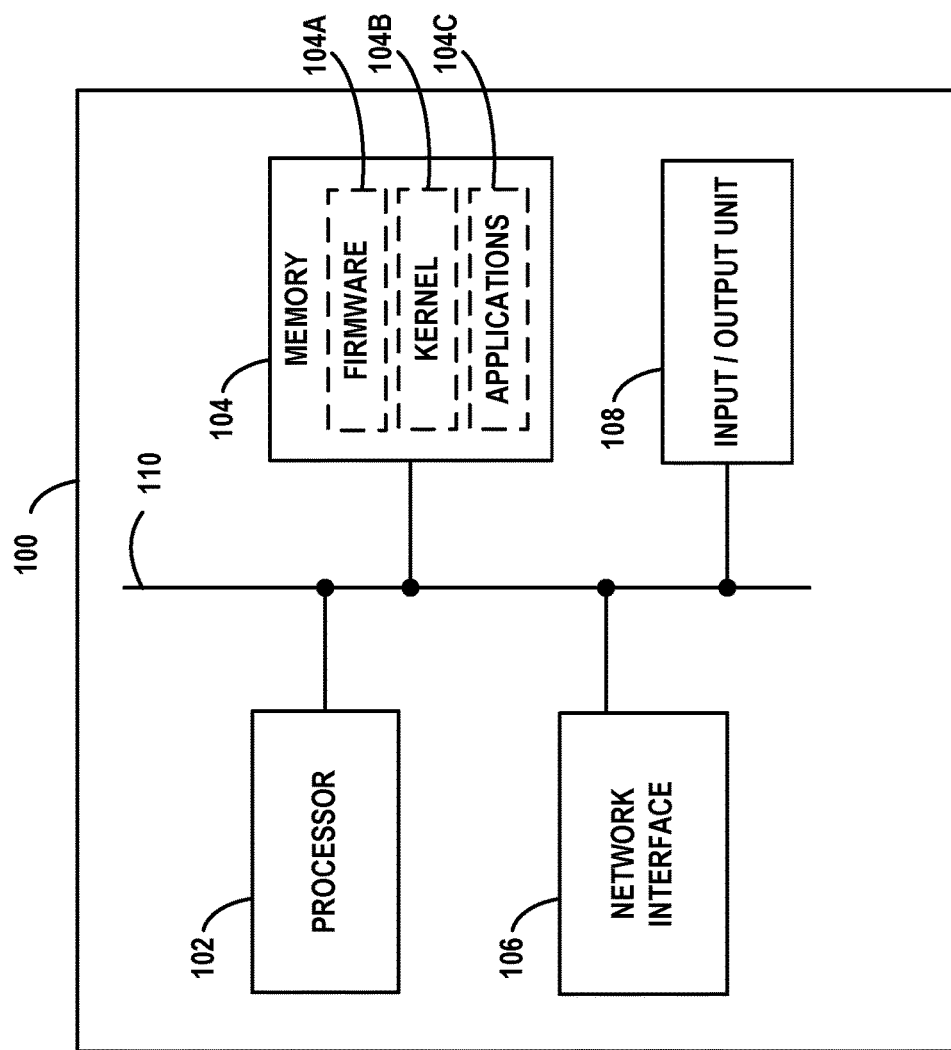
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security. Nonetheless, the embodiments herein are not limited to enterprise applications or environments, and can be more broadly applied.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure. In some cases, applications structured differently than MVC, such as those using unidirectional data flow, may be employed.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HyperText Markup Language (HTML) and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® bytecode) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
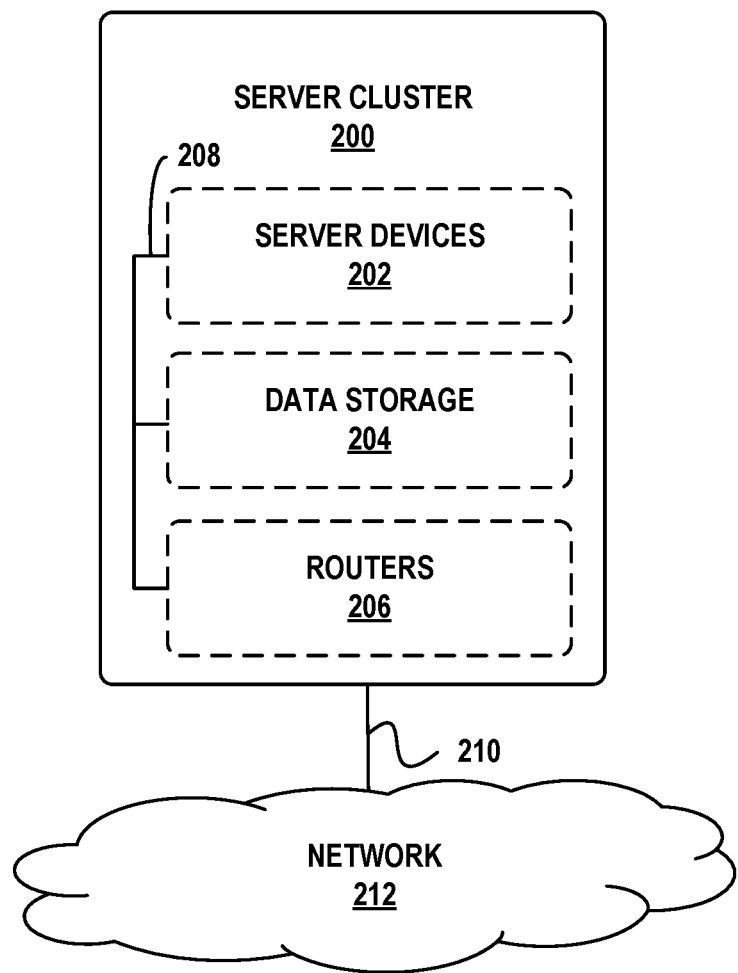
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as HTML, the extensible Markup Language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
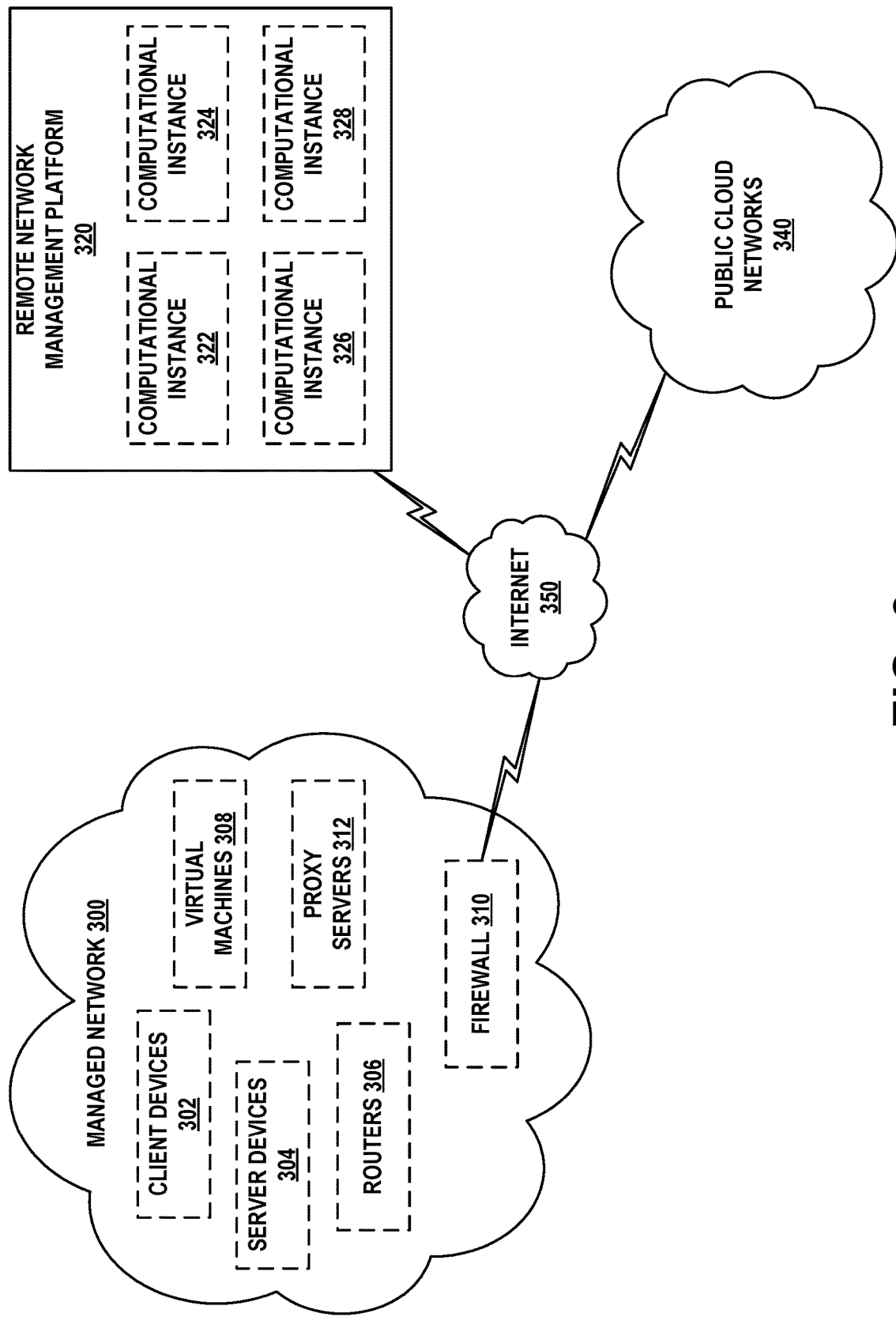
FIG. 3 depicts a remote network management architecture, in accordance with example embodiments.

FIG. 3 depicts a remote network management architecture, in accordance with example embodiments. This architecture includes three main components-managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components.

Possibly with the assistance of proxy servers 312, remote network management platform 320 may also be able to discover and manage aspects of public cloud networks 340 that are used by managed network 300. While not shown in FIG. 3, one or more proxy servers 312 may be placed in any of public cloud networks 340 in order to facilitate this discovery and management.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include Amazon AWS Cloud, Microsoft Azure Cloud (Azure), Google Cloud Platform (GCP), and IBM Cloud Platform. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
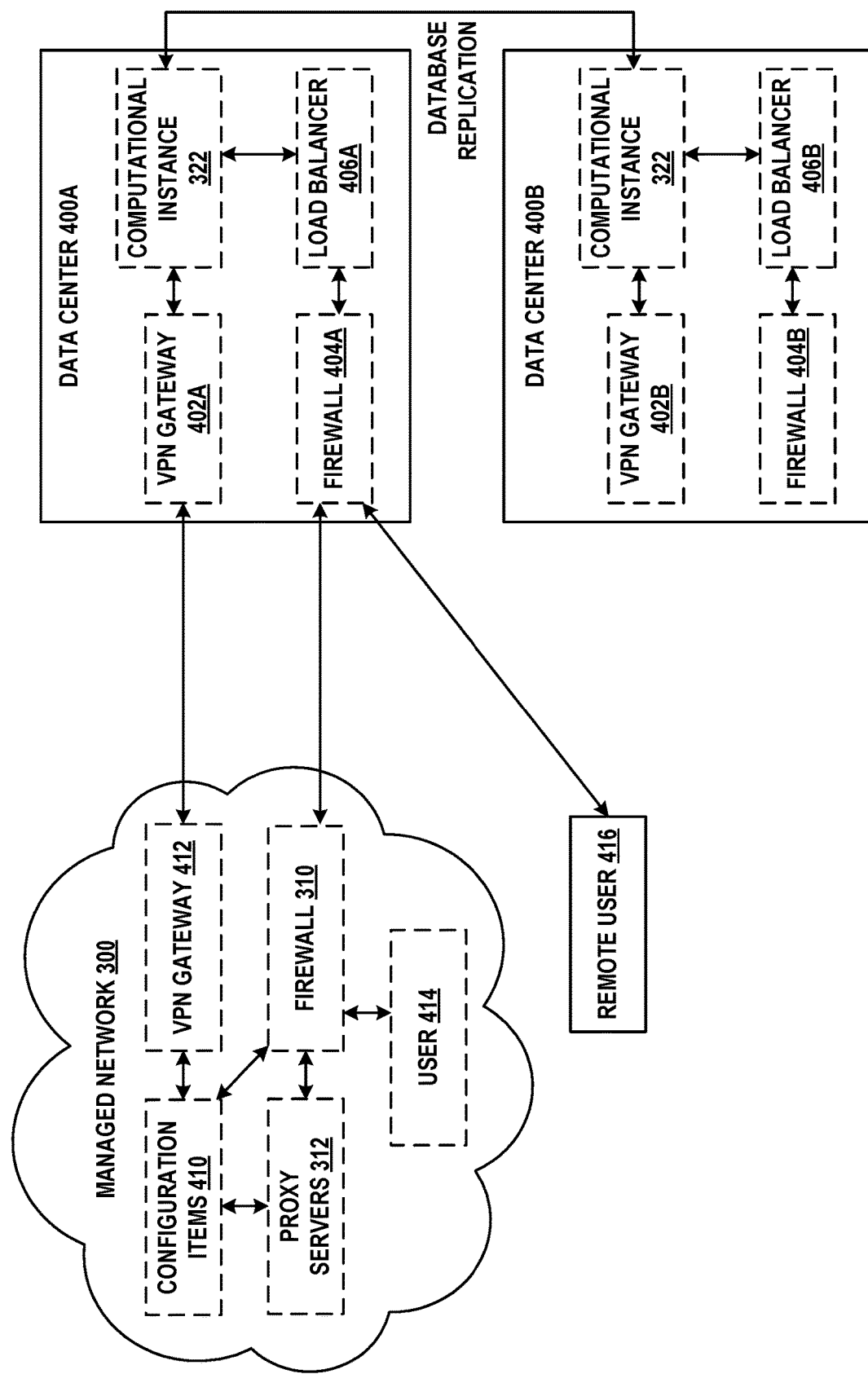
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any components thereof, any applications or services executing thereon, as well as relationships between devices, components, applications, and services. Thus, the term "configuration items" may be shorthand for part of all of any physical or virtual device, or any application or service remotely discoverable or managed by computational instance 322, or relationships between discovered devices, applications, and services. Configuration items may be represented in a configuration management database (CMDB) of computational instance 322.

As stored or transmitted, a configuration item may be a list of attributes that characterize the hardware or software that the configuration item represents. These attributes may include manufacturer, vendor, location, owner, unique identifier, description, network address, operational status, serial number, time of last update, and so on. The class of a configuration item may determine which subset of attributes are present for the configuration item (e.g., software and hardware configuration items may have different lists of attributes).

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively). In various alternatives, devices in managed network 300, such as proxy servers 312, may use a secure protocol (e.g., TLS) to communicate directly with one or more data centers.

IV. Example Discovery

In order for remote network management platform 320 to administer the devices, applications, and services of managed network 300, remote network management platform 320 may first determine what devices are present in managed network 300, the configurations, constituent components, and operational statuses of these devices, and the applications and services provided by the devices. Remote network management platform 320 may also determine the relationships between discovered devices, their components, applications, and services. Representations of each device, component, application, and service may be referred to as a configuration item. The process of determining the configuration items and relationships within managed network 300 is referred to as discovery, and may be facilitated at least in part by proxy servers 312. Representations of configuration items and relationships are stored in a CMDB.

While this section describes discovery conducted on managed network 300, the same or similar discovery procedures may be used on public cloud networks 340. Thus, in some environments, "discovery" may refer to discovering configuration items and relationships on a managed network and/or one or more public cloud networks.

For purposes of the embodiments herein, an "application" may refer to one or more processes, threads, programs, client software modules, server software modules, or any other software that executes on a device or group of devices. A "service" may refer to a high-level capability provided by one or more applications executing on one or more devices working in conjunction with one another. For example, a web service may involve multiple web application server threads executing on one device and accessing information from a database application that executes on another device.

Figure 5:
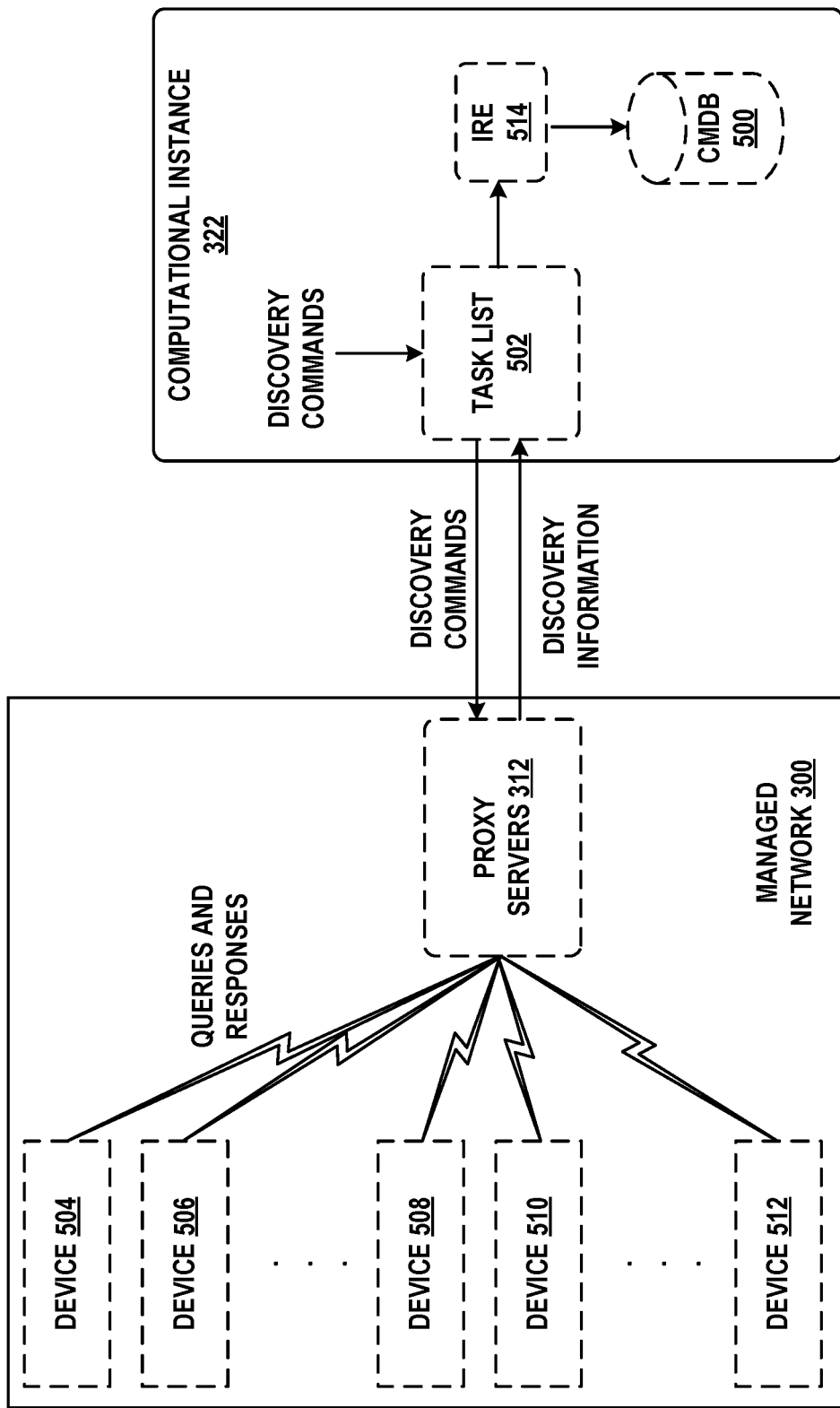
FIG. 5 depicts another communication environment involving a remote network management architecture, in accordance with example embodiments.

FIG. 5 provides a logical depiction of how configuration items and relationships can be discovered, as well as how information related thereto can be stored. For sake of simplicity, remote network management platform 320, public cloud networks 340, and Internet 350 are not shown.

In FIG. 5, CMDB 500, task list 502, and identification and reconciliation engine (IRE) 514 are disposed and/or operate within computational instance 322. Task list 502 represents a connection point between computational instance 322 and proxy servers 312. Task list 502 may be referred to as a queue, or more particularly as an external communication channel (ECC) queue. Task list 502 may represent not only the queue itself but any associated processing, such as adding, removing, and/or manipulating information in the queue.

As discovery takes place, computational instance 322 may store discovery tasks (jobs) that proxy servers 312 are to perform in task list 502, until proxy servers 312 request these tasks in batches of one or more. Placing the tasks in task list 502 may trigger or otherwise cause proxy servers 312 to begin their discovery operations. For example, proxy servers 312 may poll task list 502 periodically or from time to time, or may be notified of discovery commands in task list 502 in some other fashion. Alternatively or additionally, discovery may be manually triggered or automatically triggered based on triggering events (e.g., discovery may automatically begin once per day at a particular time).

Regardless, computational instance 322 may transmit these discovery commands to proxy servers 312 upon request. For example, proxy servers 312 may repeatedly query task list 502, obtain the next task therein, and perform this task until task list 502 is empty or another stopping condition has been reached. In response to receiving a discovery command, proxy servers 312 may query various devices, components, applications, and/or services in managed network 300 (represented for sake of simplicity in FIG. 5 by devices 504, 506, 508, 510, and 512). These devices, components, applications, and/or services may provide responses relating to their configuration, operation, and/or status to proxy servers 312. In turn, proxy servers 312 may then provide this discovered information to task list 502 (i.e., task list 502 may have an outgoing queue for holding discovery commands until requested by proxy servers 312 as well as an incoming queue for holding the discovery information until it is read).

IRE 514 may be a software module that removes discovery information from task list 502 and formulates this discovery information into configuration items (e.g., representing devices, components, applications, and/or services discovered on managed network 300) as well as relationships therebetween. Then, IRE 514 may provide these configuration items and relationships to CMDB 500 for storage therein. The operation of IRE 514 is described in more detail below.

In this fashion, configuration items stored in CMDB 500 represent the environment of managed network 300. As an example, these configuration items may represent a set of physical and/or virtual devices (e.g., client devices, server devices, routers, or virtual machines), applications executing thereon (e.g., web servers, email servers, databases, or storage arrays), as well as services that involve multiple individual configuration items. Relationships may be pairwise definitions of arrangements or dependencies between configuration items.

In order for discovery to take place in the manner described above, proxy servers 312, CMDB 500, and/or one or more credential stores may be configured with credentials for the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

There are two general types of discovery—horizontal and vertical (top-down). Each are discussed below.

A. Horizontal Discovery

Horizontal discovery is used to scan managed network 300, find devices, components, and/or applications, and then populate CMDB 500 with configuration items representing these devices, components, and/or applications. Horizontal discovery also creates relationships between the configuration items. For instance, this could be a "runs on" relationship between a configuration item representing a software application and a configuration item representing a server device on which it executes. Typically, horizontal discovery is not aware of services and does not create relationships between configuration items based on the services in which they operate.

There are two versions of horizontal discovery. One relies on probes and sensors, while the other also employs patterns. Probes and sensors may be scripts (e.g., written in JAVASCRIPT®) that collect and process discovery information on a device and then update CMDB 500 accordingly. More specifically, probes explore or investigate devices on managed network 300, and sensors parse the discovery information returned from the probes.

Patterns are also scripts that collect data on one or more devices, process it, and update the CMDB. Patterns differ from probes and sensors in that they are written in a specific discovery programming language and are used to conduct detailed discovery procedures on specific devices, components, and/or applications that often cannot be reliably discovered (or discovered at all) by more general probes and sensors. Particularly, patterns may specify a series of operations that define how to discover a particular arrangement of devices, components, and/or applications, what credentials to use, and which CMDB tables to populate with configuration items resulting from this discovery.

Both versions may proceed in four logical phases: scanning, classification, identification, and exploration. Also, both versions may require specification of one or more ranges of IP addresses on managed network 300 for which discovery is to take place. Each phase may involve communication between devices on managed network 300 and proxy servers 312, as well as between proxy servers 312 and task list 502. Some phases may involve storing partial or preliminary configuration items in CMDB 500, which may be updated in a later phase.

In the scanning phase, proxy servers 312 may probe each IP address in the specified range(s) of IP addresses for open Transmission Control Protocol (TCP) and/or User Datagram Protocol (UDP) ports to determine the general type of device and its operating system. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist.

In the classification phase, proxy servers 312 may further probe each discovered device to determine the type of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the specific type of operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 10, as a set of WINDOWS®-10-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500 along with any relevant relationships therebetween. Doing so may involve passing the identification information through IRE 514 to avoid generation of duplicate configuration items, for purposes of disambiguation, and/or to determine the table(s) of CMDB 500 in which the discovery information should be written.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (software applications), and so on. Once more, the discovered information may be stored as one or more configuration items in CMDB 500, as well as relationships.

Running horizontal discovery on certain devices, such as switches and routers, may utilize SNMP. Instead of or in addition to determining a list of running processes or other application-related information, discovery may determine additional subnets known to a router and the operational state of the router's network interfaces (e.g., active, inactive, queue length, number of packets dropped, etc.). The IP addresses of the additional subnets may be candidates for further discovery procedures. Thus, horizontal discovery may progress iteratively or recursively.

Patterns are used only during the identification and exploration phases-under pattern-based discovery, the scanning and classification phases operate as they would if probes and sensors are used. After the classification stage completes, a pattern probe is specified as a probe to use during identification. Then, the pattern probe and the pattern that it specifies are launched.

Patterns support a number of features, by way of the discovery programming language, that are not available or difficult to achieve with discovery using probes and sensors. For example, discovery of devices, components, and/or applications in public cloud networks, as well as configuration file tracking, is much simpler to achieve using pattern-based discovery. Further, these patterns are more easily customized by users than probes and sensors. Additionally, patterns are more focused on specific devices, components, and/or applications and therefore may execute faster than the more general approaches used by probes and sensors.

Once horizontal discovery completes, a configuration item representation of each discovered device, component, and/or application is available in CMDB 500. For example, after discovery, operating system version, hardware configuration, and network configuration details for client devices, server devices, and routers in managed network 300, as well as applications executing thereon, may be stored as configuration items. This collected information may be presented to a user in various ways to allow the user to view the hardware composition and operational status of devices.

Furthermore, CMDB 500 may include entries regarding the relationships between configuration items. More specifically, suppose that a server device includes a number of hardware components (e.g., processors, memory, network interfaces, storage, and file systems), and has several software applications installed or executing thereon. Relationships between the components and the server device (e.g., "contained by" relationships) and relationships between the software applications and the server device (e.g., "runs on" relationships) may be represented as such in CMDB 500.

More generally, the relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

In this manner, remote network management platform 320 may discover and inventory the hardware and software deployed on and provided by managed network 300.

B. Vertical Discovery

Vertical discovery is a technique used to find and map configuration items that are part of an overall service, such as a web service. For example, vertical discovery can map a web service by showing the relationships between a web server application, a LINUX® server device, and a database that stores the data for the web service. Typically, horizontal discovery is run first to find configuration items and basic relationships therebetween, and then vertical discovery is run to establish the relationships between configuration items that make up a service.

Patterns can be used to discover certain types of services, as these patterns can be programmed to look for specific arrangements of hardware and software that fit a description of how the service is deployed. Alternatively or additionally, traffic analysis (e.g., examining network traffic between devices) can be used to facilitate vertical discovery. In some cases, the parameters of a service can be manually configured to assist vertical discovery.

In general, vertical discovery seeks to find specific types of relationships between devices, components, and/or applications. Some of these relationships may be inferred from configuration files. For example, the configuration file of a web server application can refer to the IP address and port number of a database on which it relies. Vertical discovery patterns can be programmed to look for such references and infer relationships therefrom. Relationships can also be inferred from traffic between devices—for instance, if there is a large extent of web traffic (e.g., TCP port 80 or 8080) traveling between a load balancer and a device hosting a web server, then the load balancer and the web server may have a relationship.

Relationships found by vertical discovery may take various forms. As an example, an email service may include an email server software configuration item and a database application software configuration item, each installed on different hardware device configuration items. The email service may have a "depends on" relationship with both of these software configuration items, while the software configuration items have a "used by" reciprocal relationship with the email service. Such services might not be able to be fully determined by horizontal discovery procedures, and instead may rely on vertical discovery and possibly some extent of manual configuration.

C. Advantages of Discovery

Regardless of how discovery information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

In another example, suppose that a database application is executing on a server device, and that this database application is used by an employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular hardware device fails.

In general, configuration items and/or relationships between configuration items may be displayed on a web-based interface and represented in a hierarchical fashion. Modifications to such configuration items and/or relationships in the CMDB may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

V. CMDB Identification Rules and Reconciliation

A CMDB, such as CMDB 500, provides a repository of configuration items and relationships. When properly provisioned, it can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information including configuration items and relationships in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API) of IRE 514. Then, IRE 514 may use a set of configurable identification rules to uniquely identify configuration items and determine whether and how they are to be written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to IRE 514, IRE 514 may attempt to match the information with one or more rules. If a match is found, the configuration item is written to the CMDB or updated if it already exists within the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, IRE 514 might only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by IRE 514 or in another fashion. These configuration items may be deleted or flagged for manual de-duplication.

VI. Access Control Lists

Access control lists (ACLs) are security mechanisms used in computing platforms (e.g., remote network management platform 320) to govern access to computing resources based on predefined rules. ACLs define permissions and restrictions for various entities, such as users, groups, applications, or network devices, by specifying which actions they are allowed or denied to perform on specific objects or network services.

ACLs typically consist of a set of rules that are evaluated sequentially until a match is found. The rules can be based on different criteria, such as user identities, user group memberships, name of the computing resource, type of the computing resource, state of the computing resource, various network address parameters, and so on.

As an example, ACLs can be employed in operating systems to control access to files and directories. ACL rules for a file might include: (i) allowing a specific user ("bob") to read and write the file, (ii) allowing a specific user group ("managers") to just read the file, and (iii) denying all other users and other entities from accessing the file in any way. In this example, the ACL grants read and write permissions to "bob" for the specified file, enabling them to view and modify its contents. The user group "managers" is granted read permission, allowing members of that group to read the file but not write the file. However, the ACL denies access to all other users and other entities, preventing them from reading or writing the file.

Here, the other entities might be applications that can read or write files. Thus, the term "user" as utilized herein includes a specific user, a specific group of users, an "all user" designation, as well as specific applications or classes of applications.

As another example, ACLs are often used on routers or firewalls to filter incoming and outgoing network traffic. Such an ACL configured on a router might include rules for: permitting all outgoing HTTP (TCP port 80) traffic from any source IP address on a local network, (ii) denying all incoming SSH (TCP port 22) traffic from a specific source IP address range, and (iii) permitting all other traffic. In this example, the ACL allows all outgoing HTTP traffic, which means any device connected to the local network can access websites via the router. However, it denies incoming SSH traffic from a particular source IP address range, thereby preventing incoming SSH connections from those specific IP addresses to devices on the local network. The last rule is a catch-all permit rule, allowing any other traffic that doesn't match the previous rules.

These are just simple examples. ACLs can be much more complex in terms of the types of computing resources to which they control access and the types of permissions that they specify. For instance, ACLs can define permissions for: files, directories, network services, peripheral devices (e.g., cameras and printers), databases (including database tables and entries within these tables), software applications, cloud-based resources, VPNs, and system configuration, just to name a few. The types of permissions may include: reading, writing, executing, deleting, creating, modifying, viewing, traversing, changing permissions of, taking ownership of, and performing administrative tasks. Therefore, ACLs can be quite diverse and vary dramatically from platform to platform.

For instance, UNIX® filesystem ACLs may only specify read, write, and execute permissions for a user, the user's group, and world (all users). Various versions of WINDOWS® allows ACLs to be attached to files, registry keys, and other types of computing resources. These ACLs generally support governance of read, modify, delete, and change owner capabilities. Other resource-specific capabilities may be defined.

Figure 6:
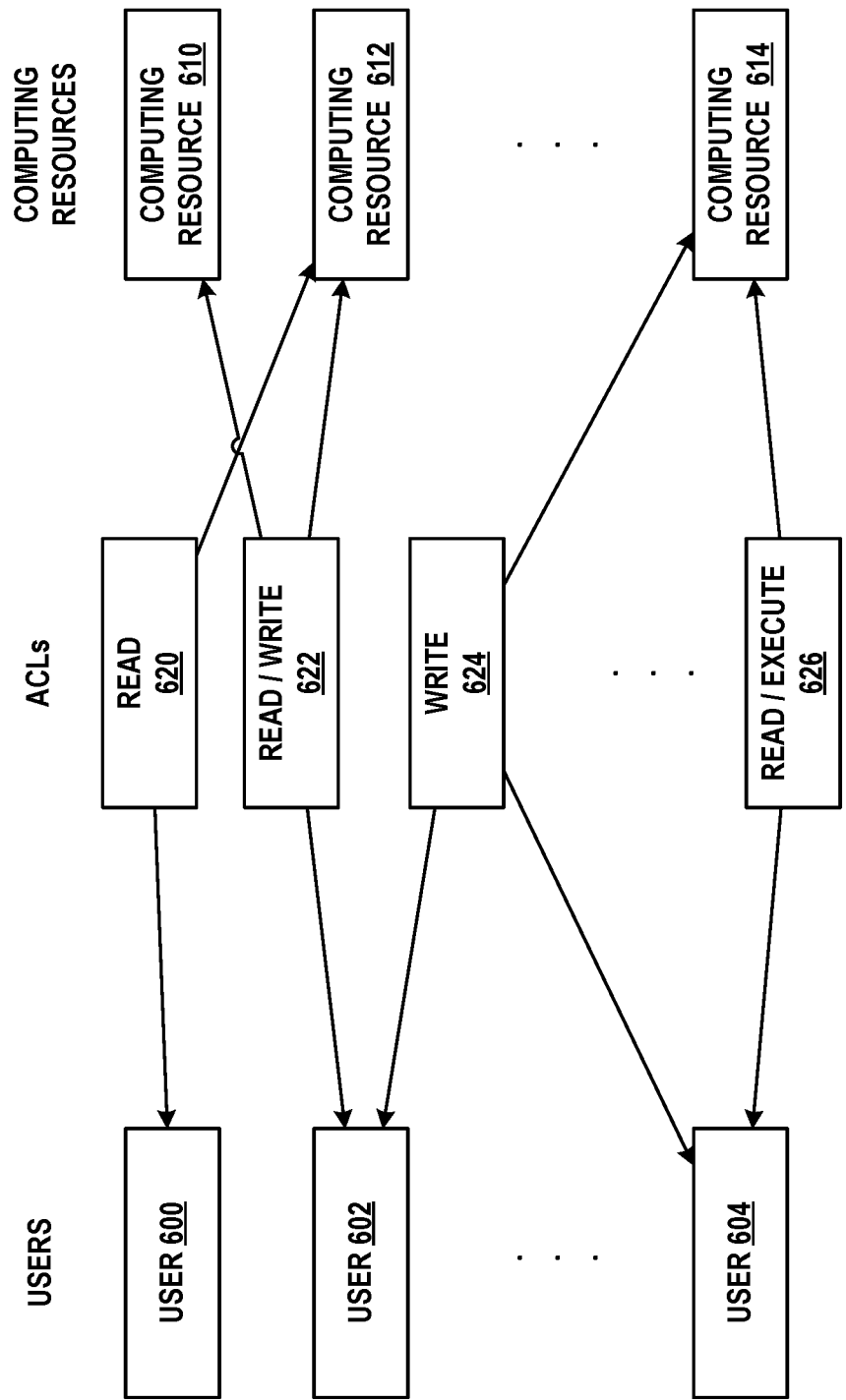
FIG. 6 depicts a set of ACLs, in accordance with example embodiments.

FIG. 6 depicts an example set of ACLs that define permissions available to a set of users with respect to a set of computing resources. ACL 620 specifies that user 600 has read access to computing resource 612. ACL 622 specifies that user 602 has read/write access to computing resources 610 and 612. ACL 624 specifies that users 602 and 604 have write access to computing resource 614. ACL 626 specifies that user 604 has read/execute access to computer resource 614. As indicated by the ellipses, there may be more or fewer users, ACLs, and computing resources in such an arrangement. Notably, ACLs may define an m: n access relationship between m users and n computing resources, where m and n are both at least 1.

The description of ACLs above focuses on those that are Boolean (e.g., true/false or allow/deny). More sophisticated ACLs can also be implemented, including ACLs that take the form of conditional arithmetic and/or logic, as well as scripts (e.g., snippets of compiled or interpreted program code). These conditions and scripts may also return Boolean values, but facilitate using more complicated logic to do so. An example of a condition found in an ACL might be "incident.state NOT IN 7,8". This condition is only true (and thus allows access to the computing resource) when the state of an incident is not one of states 7 or 8. An example of a simple script found in an ACL might be "if user.group()=='administrators' then true; else false". This script will only return true (and thus allow access to the computing resource) when the calling user is in the administrators group. In some cases, the functionality of scripts may be a superset of the functionality of conditions—i.e., any operation that can be performed by way of a condition can also be performed by way of a script.

VII. Task-Based Applications and Tables

Remote network management platform 320 may furnish various IT service management (ITSM) solutions including task-based applications designed to streamline and manage specific processes. Each of these applications may be implemented using specific tables in a database (task-based tables) to store task information. Three prominent examples are incident management, case management, and problem management.

Incident management focuses on the efficient resolution of IT service disruptions or incidents. When an issue or disruption occurs, it is logged as an incident in the incident management application. This application allows IT teams to track and manage these incidents throughout their lifecycles. It includes features such as incident creation/generation, assignment, prioritization, escalation, communication, and resolution. The incident management application provides workflows, notifications, and collaboration tools to facilitate the prompt and efficient addressing of incidents, with a goal of minimizing their impact on platform and system operations.

Case management is designed to handle diverse types of processes, requests, or workflows. It enables users to manage complex requests or changes that require coordination across multiple groups. The case management application provides a unified platform to capture, track, and manage cases from initiation to resolution. It includes features such as case creation, classification, assignment, task tracking, collaboration, and closure. This application can be tailored to various uses, such as HR inquiries, legal matters, facilities management, and customer support escalations among others.

Problem management is drawn to identifying and addressing the root causes of recurring incidents or issues. It helps IT teams identify underlying problems that lead to multiple incidents, analyze their impact, and initiate appropriate actions for resolution. A problem management application may provide tools for problem identification, investigation, prioritization, and tracking. It allows users to link related incidents, perform root cause analysis, define workarounds or solutions, and track the progress of problem resolution. The application helps groups minimize the occurrence and impact of recurring issues, leading to improved service quality and stability for the platform and other systems.

The task-based tables for each of these applications can be implemented as extensions to a base task table. Each entry in such a task-based table represents a single task. The base task table provides a set of standard fields that are used in task-based tables that are extensions thereof. Examples of these fields are shown below in Table 1.

TABLE 1

| Label | Name | Type | Description |
| --- | --- | --- | --- |
| Active | active | Boolean | Specifies whether work is still being done on a task or whether the work for the task is complete. |
| Additional comments | comments | journal_input | Displays and allows the entry of comments about the task entry. Each comment is inserted into the activity stream for the task. |

TABLE 1-continued

| Label | Name | Type | Description |
|---|---|---|---|
| Approval History | approval_history | journal | Displays the history of approvals for the entry. |
| Assigned To | assigned_to | reference | Specifies the user assigned to complete the task. |
| Created | sys_created_on | date time | Displays the date and time when the task entry was created. |
| Description | description | string | Displays and allows the entry of a multi-line description of the work to be done. |
| Number | number | string | Displays an identifying number for each task entry. The system generates this number when the task is created. |
| Opened by | opened_by | string | Identify of the user who opened the task. |
| Opened | opened_at | date time | Displays the date and time when the task entry was opened for the first time. |
| Priority | priority | integer | Specifies how high a priority the task should be for the assignee. |
| Short Description | short_description | string | Displays and allows the entry of a short description of the task, which is a human-readable title for the entry. |
| State | state | integer | Displays a choice list for status of the task (e.g., open, pending, work in progress, closed). |
| Sys ID | sys_id | GUID | Displays a unique record identifier for the task. |
| Work notes | work_notes | journal_input | Displays and allows the entry of comments viewable only by agents and stakeholders (see below). |

For each field, the label is a human-readable designation for the field, the name identifies the text string used to represent the field in the table, the type indicates the type of data stored in the field, and the description briefly describes the function and/or purpose of the field. This is just a subset of fields found in the base task table, and other fields may be present. Further, the task-based tables that are extensions of the base task table (e.g., tables for storing data relating to incidents, cases, and problems) may contain further application-specific fields.

While most of the field types are self-explanatory (e.g., Boolean, reference, date_time, string, and integer), others are more specific to task-based applications. The journal and journal_input field types allow free-form notes to be added to a task, typically by an agent or manager who is responsible for resolving the task. The main difference between the two is that journal fields are displayed with the task and journal_input field types are not (but can be viewed by browsing the database). Also the GUID field type may be a character string (e.g., 32 or more characters) that uniquely identifies tasks within a computational instance.

VIII. User Classes

Each user on a computing platform has their access to computing resources defined by a number of ACLs. In some cases, there may be hundreds of ACLs per user. As these ACLs define what the user can or cannot do per computing resource, the user's class with respect to that computing resource can be determined by evaluating the ACLs that define their access to the computer resource. In other words, for sake of simplicity and ease of use, any user can be mapped to one of several classes per computing resource based on their ACLs. These classes are defined as follows:

A requester can read and write the tasks they opened in task-based tables, but not other tasks in these tables. A requester can also read non-task tables. In practice, a requester is typically a non-privileged user who can access the tasks they open but no one else's tasks.

A fulfiller can read and write to any table, whether task-based or otherwise. In practice, a fulfiller is typically an agent who assist requesters with their requests.

An approver can approve certain requests that require such approval. Thus, an approver can change the state of certain tasks from "waiting for approval" to "approved". In practice an approver might be a manager or controller who determines whether certain request are to be fulfilled.

A stakeholder can read any table. In practice a stakeholder is typically on operations manager who is assigning tasks to fulfillers and/or reviewing the work of fulfillers.

In some cases, there may be a further type of class for "superuser" or "administrative" access, which puts little or no restrictions on what that type of user may do with respect to a computing resource. Nonetheless, a possible goal is to classify users into a relatively small and manageable number of discrete user classes. In some cases, this number is in the range of 3-6, but other values may be possible (e.g., 8, 10, 12, etc.).

The computing resources for which permissions are governed by ACLs may include task-based tables (e.g., tables for storing data relating to incidents, cases, and problems). In some uses of remote network management platform 320, these task-based tables are prevalent and well-used constructs. Thus, determining a class from a user's ACLs may include determining whether and how the ACLs define permissions relating to a task-based table.

IX. Determining User Classes from ACLs

As noted, there can be tens of thousands of ACLs defined for users of a computational instance of a remote network management platform. These ACLs may grant a particular user different capabilities for different software applications. For example, a user can simultaneously be a requestor for the incident application and a stakeholder for the case application.

In order to determine these application-specific classes for each user, ACLs that govern the user's access to database tables and other computing resources of the application can be examined and scored. The result of this scoring procedure is an indication of the most likely user classes for the user with respect to that application. In other words, by analyzing computing resources used by an application and a user's ACLs that govern the user's access to the computing resources, the user's per-application class for that application can be estimated within a degree of confidence. Notably, these estimations may not be perfect and perfection thereof is not required. They only need to be reasonably accurate. Mapping a large number of ACL capabilities into 3-6 user classes (for example) may not be possible with 100% accuracy. Thus, in some cases, the embodiments herein may place two or more users with similar but slightly differing capabilities into the same class.

Figure 7:
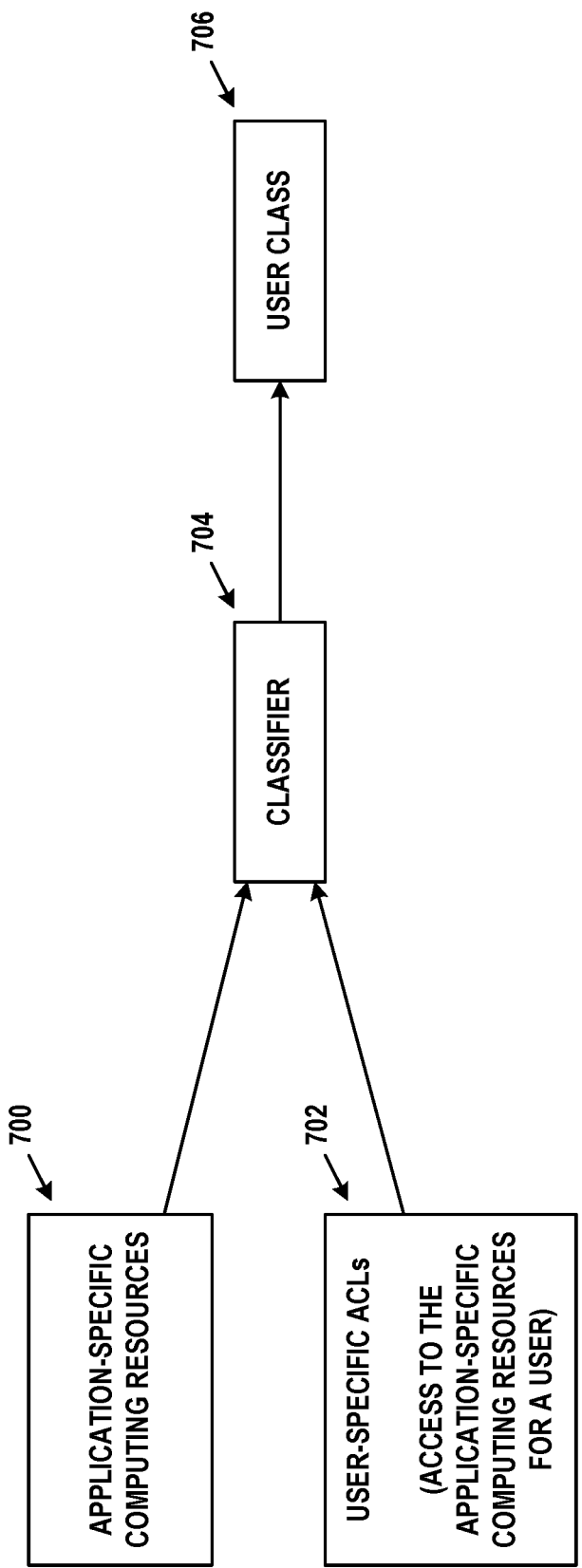
FIG. 7 depicts a user classification process based on ACLs, in accordance with example embodiments.

FIG. 7 depicts the input and output of a classifier for determining a user's class with respect to a specific application. Classifier 704 takes as input application-specific computing resources 700 and user-specific ACLs 702. As noted in FIG. 7, user-specific ACLs 702 govern a particular user's access to application-specific computing resources 700. The output of classifier 704 is user class 706, which may be one of the user classes described above (e.g., requester, fulfiller, approver, or stakeholder) or a class from a different list of user classes.

The classification determination made by classifier 704 may consider a number of factors. These factors may be expressed in the form of one or more rules used by a software application (e.g., including classifier 704) to evaluate the ACLs. Notably, the rules used to classify ACLs are different from the rules in the ACLs themselves. The latter are used to define user permissions with respect to computing resources rather than estimating a user class. Thus, the term "rule" is overloaded herein and its proper interpretation can be identified based on context.

The first factor is the type of computing resource, and whether that resource is a task-based table, a many-to-many table, some other type of table, or configuration data. As noted, a task-based table contains information used by task-based applications (e.g., incident, case, and problem management applications). Many-to-many tables associate references to two or more other tables. Other types of tables may include log data, for example. Configuration data may be stored in tables or files within a filesystem.

The second factor is whether the operation controlled by the ACL is a read or write operation. In some implementations, other types of operations (e.g., execute, modify, create, and/or delete) may be considered as well. The focus is on read and write access because these operations typically are more relevant to determining a user's classes than the other types of operations.

The third factor is whether there are any conditions or scripts that are used to determine whether the user can perform the operation. Generally speaking, if there are no conditions or scripts in place, then an ACL allowing access to the computing resource is putting no further limitations on this access, which may be indicative of a highly-privileged user (e.g., a fulfiller or stakeholder).

When there is a script used to determine whether the user can perform the operation, the fourth factor is whether this script is or invokes an approver script. Here, an approver script is any script that can write to the approval_history field of a task-based table, write to a dedicated table of approvals (e.g., the sysapproval_approver table) or otherwise indicates approver capabilities. Invocation of an approver script is strong evidence that the user should be classified as an approver.

Also when there is a script used to determine whether the user can perform the operation, the fifth factor is whether this script is limited by the current user. Limiting the script in this fashion is strong evidence that the user is a requester and thus only able to view their own tasks in a task-based application. An example of a script is limited by the current user is one that invokes a function to identify the current user and/or the current user's capabilities. For instance, the script may check that the current user's userid matches that of the user who opened the tasks. The script logic to perform this task may be, for example: "if (task.opened_by==getUserID( ))".

In some cases, more or fewer factors may be considered. Moreover, different factors than those described above may be considered, and the order of consideration may vary. In the case of conditions and scripts, classifier 704 may read textual representations of these items and parse out certain strings or patterns. For instance, classifier 704 may determine whether an ACL is conditional or unconditional based on the presence of a condition or script associated with the ACL. Likewise, classifier 704 may search for a function call (e.g., getUserID( )) in an ACL script in order determine whether the ACL has certain characteristics (e.g., is personalized).

Figure 8:
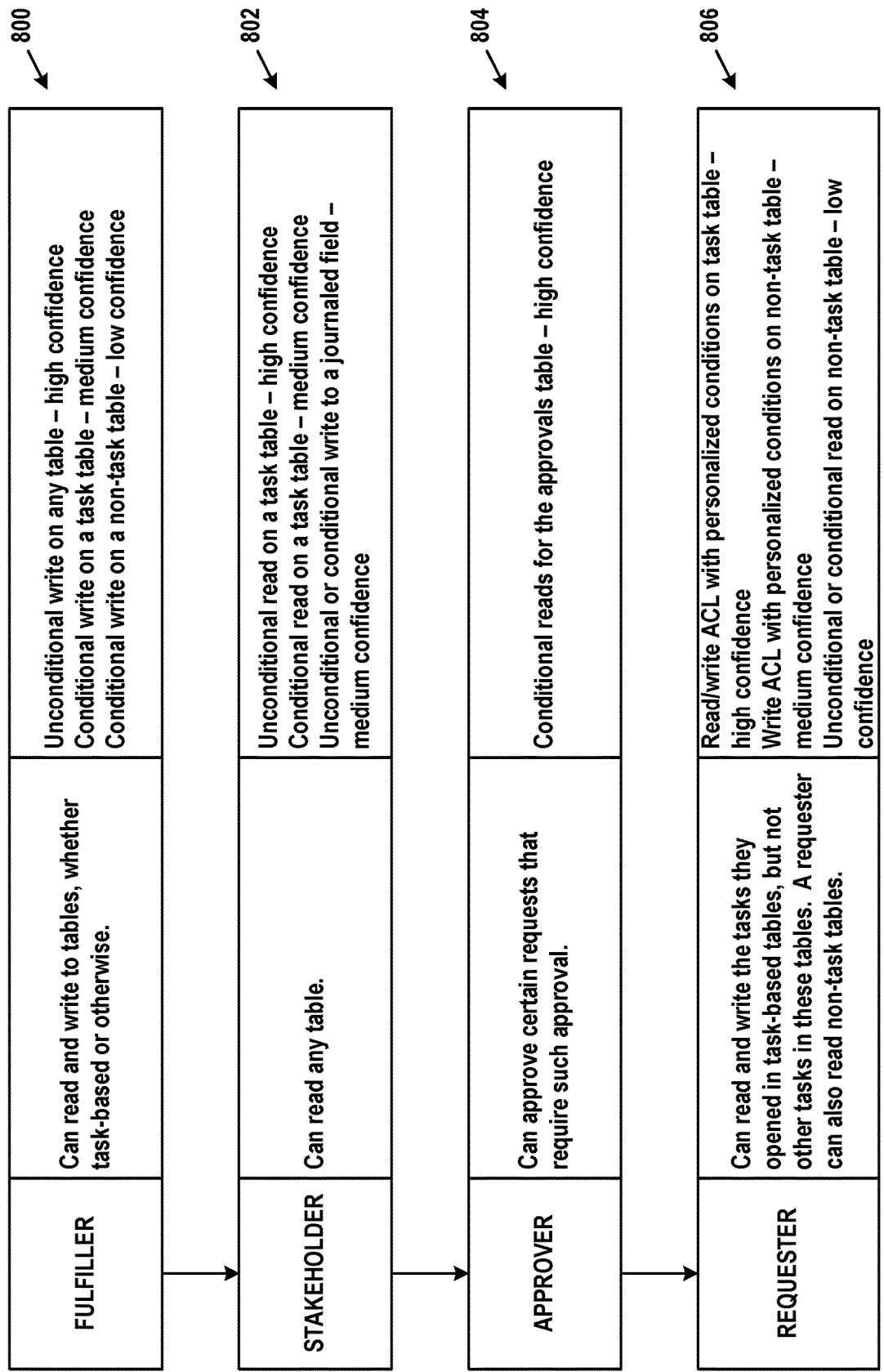
FIG. 8 depicts a simplified process for determining user class based on ACL content, in accordance with example embodiments.

FIG. 8 depicts one way for classifier 704 to estimate a user's class for a given application. It is assumed that the evaluations for each possible class occurs in the order shown (block 800, then block 802, then block 804, then block 806) with the estimated class being the first one matched. But in other embodiments, each block may be evaluated and then the class with the highest evaluation or best match is chosen.

At block 800, classifier 704 determines whether the user is a fulfiller with respect to the application. The determination is made with high confidence if the ACLs allow the user to write to any table. Otherwise, the determination is made with medium confidence if the ACLs allow the user to conditionally write to a task-based table. Otherwise, the determination is made with low confidence if the ACLs allow the user to conditionally write to a non-task-based table. If none of these determinations are made, control passes to block 802.

At block 802, classifier 704 determines whether the user is a stakeholder with respect to the application. The determination is made with high confidence if the ACLs allow the user to unconditionally read from a task-based table. Otherwise, the determination is made with medium confidence if the ACLs allow the user to conditionally read from a task-based table. The determination is also made with medium confidence if the ACLs allow the user to conditionally or unconditionally write to a journaled field (e.g., of type journal or journal_input). If none of these determinations are made, control passes to block 804.

At block 804, classifier 704 determines whether the user is an approver with respect to the application. The determination is made with high confidence if the ACLs allow the user to conditionally read from the approver's table. If this determination is not made, control passes to block 806.

At block 806, classifier 704 determines whether the user is a requester with respect to the application. The determination is made with high confidence if the ACLs allow the user to read and write to a task-based table with personalized conditions. Otherwise, the determination is made with medium confidence if the ACLs allow the user to write to a non-task-based table with personalized conditions. Otherwise, the determination is made with low confidence if the ACLs allow the user to conditionally or unconditionally read from a non-task-based table.

Figure 9:
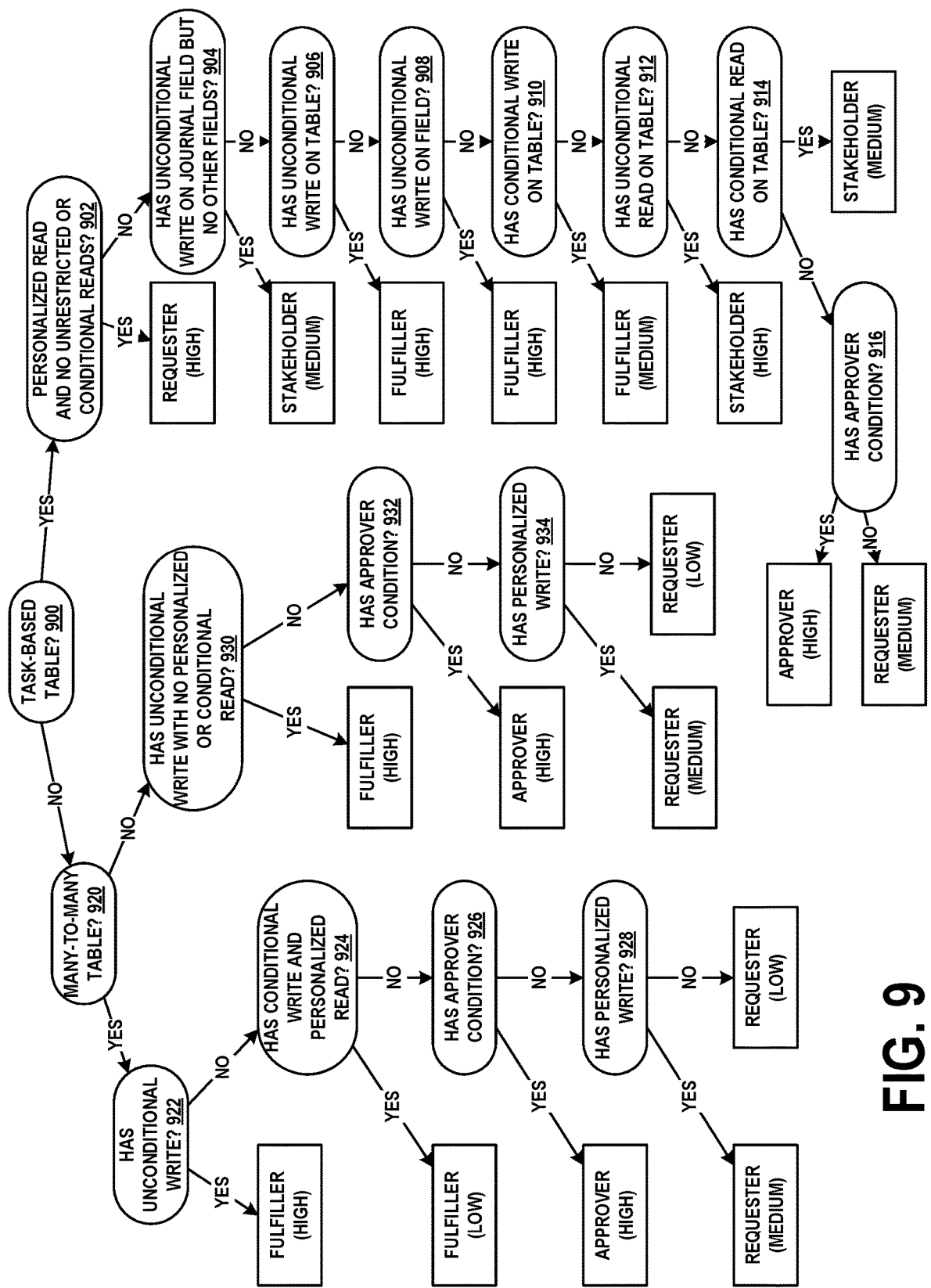
FIG. 9 depicts a more thorough process for determining user class based on ACL content, in accordance with example embodiments.

FIG. 9 depicts a more thorough way of estimating a user's class and a confidence thereof from per-application ACLs in the form of a decision tree. Notably, following the process depicted in FIG. 9 may (in some cases) result in a different classification than following the process depicted in FIG. 8.

At block 900, it is determined whether an ACL is governing access to a task-based table. If so, control passes to block 902. Otherwise, control passes to block 920.

At block 902, it is determined whether the ACL provides for personalized read access and otherwise no unrestricted or conditional reads to the task-based table. In other words, this user can read their own entries in this table but no other entries. If so, it is estimated with high confidence that the user's class is requester for this ACL. Otherwise control passes to block 904.

At block 904, it is determined whether the ACL provides for unconditional writes on a journal field but no other field of the task-based table. If so, it is estimated with medium confidence that the user is a stakeholder for this ACL. Otherwise control passes to block 906.

At block 906, it is determined whether the ACL provides for unconditional writes on the task-based table. If so, it is estimated with high confidence that the user is a fulfiller for this ACL. Otherwise control passes to block 908.

At block 908, it is determined whether the ACL provides for unconditional writes on a specific field of the task-based table. If so, it is estimated with high confidence that the user is a fulfiller for this ACL. Otherwise control passes to block 910.

At block 910, it is determined whether the ACL provides for conditional writes on the task-based table. If so, it is estimated with medium confidence that the user is a fulfiller for this ACL. Otherwise control passes to block 912.

At block 912, it is determined whether the ACL provides for unconditional reads on the task-based table. If so, it is estimated with high confidence that the user is a stakeholder for this ACL. Otherwise control passes to block 914.

At block 914, it is determined whether the ACL provides for conditional reads on the task-based table. If so, it is estimated with medium confidence that the user is a stakeholder for this ACL. Otherwise control passes to block 916.

At block 916, it is determined whether the ACL indicates that the user has the approver condition for the task-based table. This condition may be true when the ACL permits the user to write to the approval_history field of the task-based table or to a separate approvals table. If so, it is estimated with high confidence that the user is an approver for this ACL. Otherwise, it is estimated with medium confidence that the user is a requester for this ACL.

At block 920, it is determined whether the ACL is governing access to a many-to-many table. If so, control passes to block 922. Otherwise, control passes to block 930.

At block 922, it is determined whether the ACL provides for unconditional writes on the many-to-many table. If so, it is estimated with high confidence that the user is a fulfiller for this ACL. Otherwise control passes to block 924.

At block 924, it is determined whether the ACL provides for conditional writes and personalized reads on the many-to-many table. If so, it is estimated with low confidence that the user is a fulfiller for this ACL. Otherwise control passes to block 926.

At block 926, it is determined whether the ACL indicates that the user has the approver condition for the many-to-many table. If so, it is estimated with high confidence that the user is an approver for this ACL. Otherwise control passes to block 928.

At block 928, it is determined whether the ACL provides for personalized writes on the many-to-many table. If so, it is estimated with medium confidence that the user is a requester for this ACL. Otherwise, it is estimated with low confidence that the user is a requester for this ACL.

At block 930, it is determined whether the ACL provides for unconditional writes with no personalized or conditional reads on the computing resource. If so, it is estimated with high confidence that the user is a fulfiller for this ACL. Otherwise control passes to block 932.

At block 932, it is determined whether the ACL indicates that the user has the approver condition for the computing resource. If so, it is estimated with high confidence that the user is an approver for this ACL. Otherwise control passes to block 934.

At block 934, it is determined whether the ACL provides for personalized writes to the computing resource. If so, it is estimated with medium confidence that the user is a requester for this ACL. Otherwise, it is estimated with low confidence that the user is a requester for this ACL.

As noted above, a user's class can be estimated in different ways than those depicted in FIGS. 8 and 9. Thus, variations of the processes shown in these figures (e.g., changing the content of decision blocks, the ordering of decision blocks, the estimated class, and/or the confidence therein) may be employed in the embodiments herein.

X. Rolling Up and Displaying Security Vulnerabilities

After determinations of user class are made for a user with respect to individual computing resources, these determinations can be rolled up (aggregated) at the application and user level to make an overall estimation of the user's class. The estimated classes of one or more users can then be used to determine possible security vulnerabilities.

Figure 10:
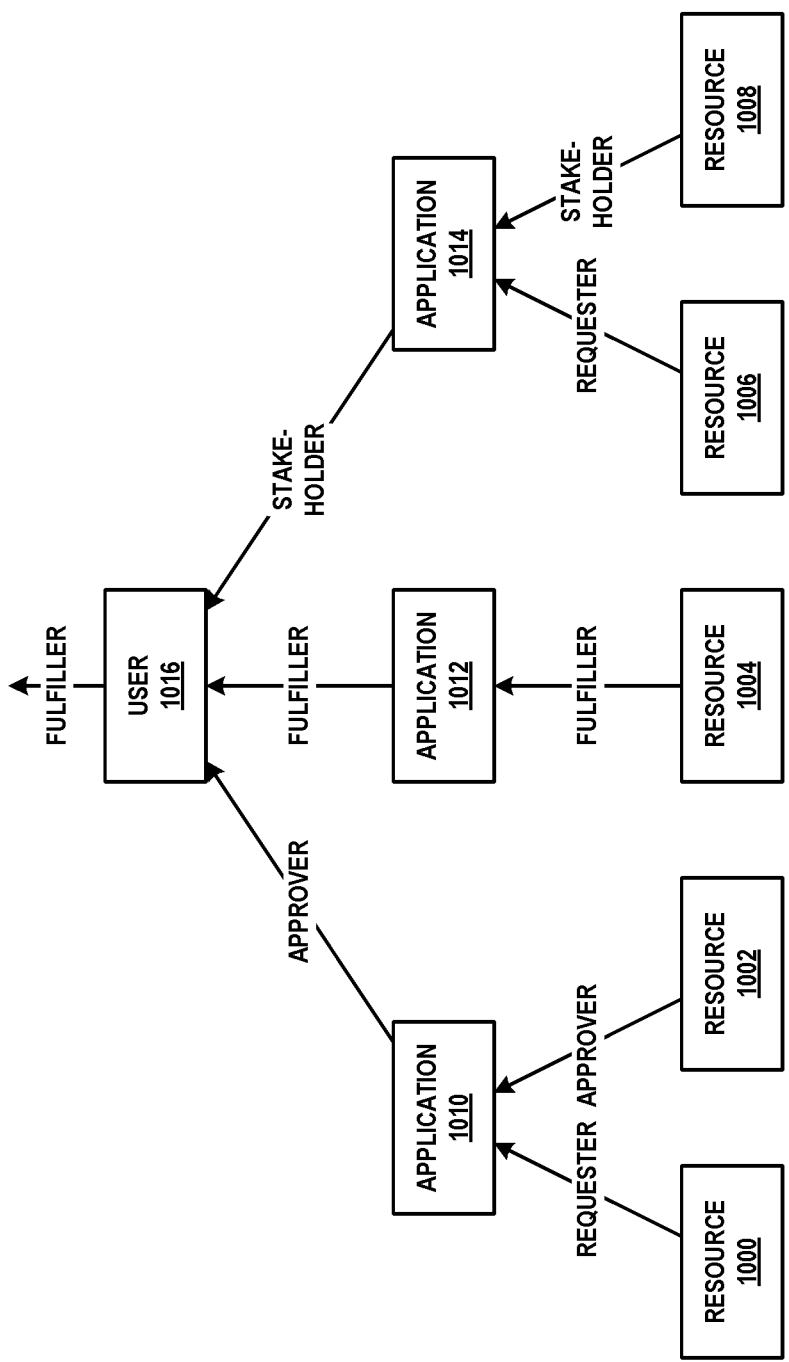
FIG. 10 depicts aggregating user classes to application and user levels, in accordance with example embodiments.

An example is shown in FIG. 10. In this figure, resources 1000 and 1002 can be accessed by way of application 1010, resource 1004 can be accessed by way of application 1012, and resources 1006 and 1008 can be accessed by way of application 1014. User 1016 has access to applications 1010, 1012, and 1014.

Based on applying classifier 704 to the ACLs of user 1016, it is determined that user 1016 is a requester for resource 1000, an approver for resource 1002, a fulfiller for resource 1004, a requester for resource 1006, and a stakeholder for resource 1008. When these class estimates are rolled up to the application level, the hierarchy shown in FIG. 8 may be used, with the highest class per computing resource being selected for each application. This hierarchy is that a fulfiller is higher than a stakeholder, a stakeholder is higher than an approver, and an approver is higher than a requester. Other hierarchies of classes may be used.

Thus, the application-level classes are approver for application 1010, fulfiller for application 1012, and stakeholder for application 1014. Then, the application-level classes can be rolled up to the user level. User 1016 is determined to be a fulfiller because that is their highest application-level class. This indicates that, for at least one computing resource associated with at least one application, user 1016 is a fulfiller. Such a class may indicate one or more security vulnerabilities if it does not reflect the intended class for user 1016.

To that point, one or more ACLs that result in user 1016 being classified as a fulfiller with respect to resource 1004 could been the result of a misunderstanding, a typographical mistake, or some other type of error. For instance, a developer of application 1012 may have set ACLs for all users of resource 1004 to be that of a fulfiller by default for purposes of unit testing, but never reset these ACLs to a more secure default value. Thus, user 1016 having the characteristics of a fulfiller may be an unintentional configuration defect.

In general, remote network management platform 320 may support one or more graphical user interfaces or other mechanisms to summarize and display the results of the classification of users of the platform. This may take the form of an indication of the number of users classified as each of fulfillers, stakeholders, approvers, and requesters. This information alone is valuable, as the numbers of fulfillers, stakeholders, and approvers are typically expected to be far lower than the number of requesters.

Moreover, the graphical user interface may allow an administrator to drill down to determine the per-application classes for each user, as well as the per-resource classes for each application. Further, the graphical user interface may indicate the level of confidence for each of these classifications. The consequence of this is that the administrator can rapidly determine each user's class, why the user has this class (e.g., which ACLs result in the user's classification), and the level of confidence therein. Such information was previously unavailable.

In some cases, the graphical user interface might flag or otherwise emphasize anomalous results that are likely evidence of security vulnerabilities. For instance, if more than a predetermined threshold percentage or number of users of a particular application are classified as approvers, this is likely not the intended configuration. Notably, this would allow any of these users to approve certain task-related requests, which may result in these users or requesters having access to systems or data that should be maintained more privately.

In some cases, the remote network management platform 320 may identify certain ACLs that are causing anomalous classifications (e.g., users who have higher classifications in the hierarchy on several applications or a large number of users with high classifications for a single application). Remote network management platform 320 may suggest ACL changes that would address these security vulnerabilities. Additionally, remote network management platform 320 may, in some cases, automatically adjust ACLs to address these security vulnerabilities when they are discovered. For instance, ACLs causing a user to be classified as fulfillers for a certain computing resource or application may be modified so that the user has a different class. This decision could be made based on information in the user's profile (e.g., being a member of an unprivileged group) or stored elsewhere. In some examples, this modification may take the form of changing at least some of the user's ACLs so that they are consistent with the user having the requester class (e.g., the user can only read from or write to their own entries in a task-based table).

XI. Example Technical Improvements

These embodiments provide a technical solution to a technical problem. One technical problem being solved is the detection and addressing of security vulnerabilities based on ACLs. In practice, this is problematic because it is common for ACLs to be misconfigured allowing users more access to computing resources than expected or desired.

In the prior art, these security vulnerabilities were difficult if not virtually impossible to detect in many real-world scenarios. To the limited extent that they exist, prior art techniques relied on subjective decisions and experiences of a system's administrators, which leads to wildly varying outcomes from instance to instance. Thus, prior art techniques did little if anything to detect security vulnerabilities in a logical, accurate, and consistent fashion.

The embodiments herein overcome these limitations by classifying ACLs into user classes based on the computing resources to which they govern access, then these classes can be rolled up on a per-application basis and a per-user basis. In this manner, security vulnerabilities can be found and handled in a more accurate and robust fashion. This results in several advantages. First, administrators can readily identify which users are in which classes and why. Second, the determined user classes can be compared to the expected capabilities for each user to determine where there are mismatches. These mismatches may be indicators of security vulnerabilities. Third, security vulnerabilities can be resolved, eliminated, and/or removed based on the results of the classifications. As a consequence, computing systems will be more secure and exhibit fewer "security holes" where users have access to information that they should be prevented from accessing. Other technical improvements may also flow from these embodiments, and other technical problems may be solved.

XII. Example Operations

Figure 11:
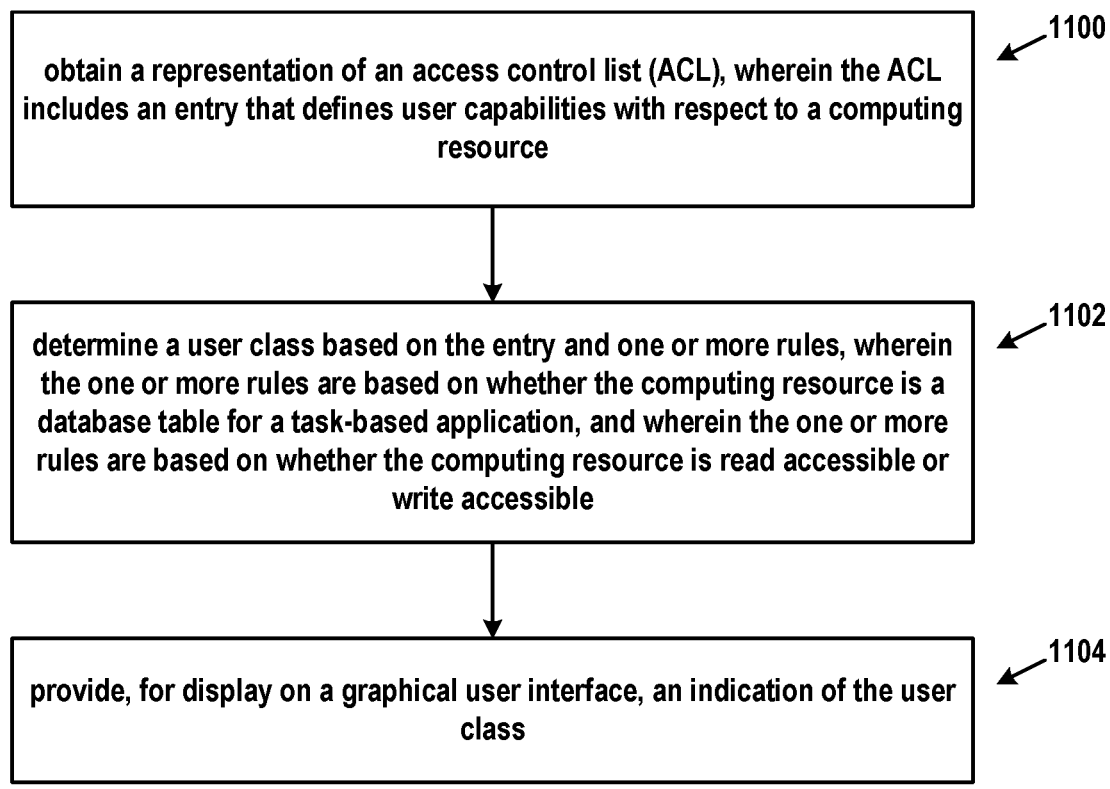
FIG. 11 is a flow chart, in accordance with example embodiments.

FIG. 11 is a flow chart illustrating an example embodiment. The process illustrated by FIG. 11 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 11 may be simplified by the removal of any one or more of the features shown therein. Further, these embodiments may be combined with features, aspects, and/or implementations of any of the previous figures or otherwise described herein.

Block 1100 may involve obtaining a representation of an ACL, wherein the ACL includes an entry that defines user capabilities with respect to a computing resource.

Block 1102 may involve determining a user class based on the entry and one or more rules, wherein the one or more rules are based on whether the computing resource is a database table for a task-based application, and wherein the one or more rules are based on whether the computing resource is read accessible or write accessible.

Block 1104 may involve providing, for display on a graphical user interface, an indication of the user class.

In some embodiments, determining the user class includes selecting the user class from among a set of user classes.

In some embodiments, the user capabilities indicate capabilities that a user has in regard to the computing resource, wherein determining the user class includes classifying the user into the user class from the set of user classes.

In some embodiments, the set of user classes consists of 3-6 distinct user classes.

In some embodiments, the set of user classes includes a fulfiller class for users that can conditionally or unconditionally write to at least one database table, a stakeholder class for users that can conditionally or unconditionally read from the database table, an approver class for users that can read from an approvals table or write to an approver field, and a requester class for users that can read from the database table on a personalized basis.

In some embodiments, the one or more rules are also based on whether the computing resource being read accessible or write accessible is conditional or unconditional, or whether the computing resource being read accessible or write accessible is personalized to a user.

In some embodiments, the user capabilities are defined as a Boolean property, a condition, or based on an outcome of executing a script of program code.

In some embodiments, determining the user class produces a confidence level for the user class, wherein the confidence level has at least two possible values, and wherein providing the indication of the user class includes providing a further indication of the confidence level.

In some embodiments, the database table stores task-based data for the task-based application.

Some embodiments may involve: obtaining a second representation of a second ACL, wherein the second ACL includes a second entry that defines second user capabilities with respect to a second computing resource; determining a second user class based on the second entry and the one or more rules; and providing, for display on the graphical user interface, a second indication of the second user class.

In some embodiments, the computing resource and the second computing resource are both used by a particular application. These embodiments may further involve: selecting, based on a hierarchy of user classes, one of the user class and the second user class as an application-level user class; and associating the application-level user class with the particular application.

Some embodiments may involve: determining, based on the user class and one or more criteria related to a user, that the user having the user class is a security vulnerability, wherein providing the indication of the user class comprises providing a further indication of the security vulnerability.

Some embodiments may involve: determining, based on the user class and one or more criteria related to a user, that the user having the user class is a security vulnerability; and modifying the ACL so that the user has a different user class.

In some embodiments, the computing resource comprises one or more of a file, a database table, a database table entry, or an interface.

XIII. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method comprising:
    obtaining a representation of an access control list (ACL), wherein the ACL includes an entry that defines user capabilities with respect to a computing resource;
    determining a user class based on the entry and one or more rules, wherein the one or more rules are based on whether the computing resource is a database table for a task-based application, and wherein the one or more rules are based on whether the computing resource is read accessible or write accessible; and
    providing, for display on a graphical user interface, an indication of the user class.

2. The method of claim 1, wherein determining the user class includes selecting the user class from among a set of user classes.

3. The method of claim 2, wherein the user capabilities indicate capabilities that a user has in regard to the computing resource, and wherein determining the user class includes classifying the user into the user class from the set of user classes.

4. The method of claim 2, wherein the set of user classes consists of 3-6 distinct user classes.

5. The method of claim 2, wherein the set of user classes includes a fulfiller class for users that can conditionally or unconditionally write to at least one database table, a stakeholder class for users that can conditionally or unconditionally read from the database table, an approver class for users that can read from an approvals table or write to an approver field, and a requester class for users that can read from the database table on a personalized basis.

6. The method of claim 1, wherein the one or more rules are also based on whether the computing resource being read accessible or write accessible is conditional or unconditional, or whether the computing resource being read accessible or write accessible is personalized to a user.

7. The method of claim 1, wherein the user capabilities are defined as a Boolean property, a condition, or based on an outcome of executing a script of program code.

8. The method of claim 1, wherein determining the user class produces a confidence level for the user class, wherein the confidence level has at least two possible values, and wherein providing the indication of the user class includes providing a further indication of the confidence level.

9. The method of claim 1, wherein the database table stores task-based data for the task-based application.

10. The method of claim 1, further comprising:
obtaining a second representation of a second ACL, wherein the second ACL includes a second entry that defines second user capabilities with respect to a second computing resource;
determining a second user class based on the second entry and the one or more rules; and
providing, for display on the graphical user interface, a second indication of the second user class.

11. The method of claim 10, wherein the computing resource and the second computing resource are both used by a particular application, the method further comprising:
selecting, based on a hierarchy of user classes, one of the user class and the second user class as an application-level user class; and
associating the application-level user class with the particular application.

12. The method of claim 1, further comprising:
determining, based on the user class and one or more criteria related to a user, that the user having the user class is a security vulnerability, wherein providing the indication of the user class comprises providing a further indication of the security vulnerability.

13. The method of claim 1, further comprising:
determining, based on the user class and one or more criteria related to a user, that the user having the user class is a security vulnerability; and
modifying the ACL so that the user has a different user class.

14. The method of claim 1, wherein the computing resource comprises one or more of a file, a database table, a database table entry, or an interface.

15. A non-transitory computer-readable medium, having stored thereon program instructions that, upon execution by a computing system, cause the computing system to perform operations comprising:

obtaining a representation of an access control list (ACL), wherein the ACL includes an entry that defines user capabilities with respect to a computing resource;
determining a user class based on the entry and one or more rules, wherein the one or more rules are based on whether the computing resource is a database table for a task-based application, and wherein the one or more rules are based on whether the computing resource is read accessible or write accessible; and
providing, for display on a graphical user interface, an indication of the user class.

16. The non-transitory computer-readable medium of claim 15, wherein the one or more rules are also based on whether the computing resource being read accessible or write accessible is conditional or unconditional, or whether the computing resource being read accessible or write accessible is personalized to a user.

17. The non-transitory computer-readable medium of claim 15, wherein determining the user class produces a confidence level for the user class, wherein the confidence level has at least two possible values, and wherein providing the indication of the user class includes providing a further indication of the confidence level.

18. The non-transitory computer-readable medium of claim 15, the operations further comprising:
determining, based on the user class and one or more criteria related to a user, that the user having the user class is a security vulnerability, wherein providing the indication of the user class comprises providing a further indication of the security vulnerability.

19. The non-transitory computer-readable medium of claim 15, the operations further comprising:
determining, based on the user class and one or more criteria related to a user, that the user having the user class is a security vulnerability; and
modifying the ACL so that the user has a different user class.

20. A system comprising:
one or more processors; and
memory, containing program instructions that, upon execution by the one or more processors, cause the system to perform operations comprising:
obtaining a representation of an access control list (ACL), wherein the ACL includes an entry that defines user capabilities with respect to a computing resource;
determining a user class based on the entry and one or more rules, wherein the one or more rules are based on whether the computing resource is a database table for a task-based application, and wherein the one or more rules are based on whether the computing resource is read accessible or write accessible; and
providing, for display on a graphical user interface, an indication of the user class.

* * * * *